United States Patent
Chen et al.

(10) Patent No.: US 11,396,115 B2
(45) Date of Patent: Jul. 26, 2022

(54) PREPARATION METHOD AND USE OF FLEXIBLE AND ELASTIC DRAG REDUCTION FILM

(71) Applicant: Beihang University, Beijing (CN)

(72) Inventors: Dengke Chen, Beijing (CN); Huawei Chen, Beijing (CN); Yang Liu, Beijing (CN); Zehui Zhao, Beijing (CN); Song Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 26 days.

(21) Appl. No.: 16/860,379

(22) Filed: Apr. 28, 2020

(65) Prior Publication Data

US 2020/0346373 A1    Nov. 5, 2020

(30) Foreign Application Priority Data

Apr. 30, 2019 (CN) .......................... 201910360355.4

(51) Int. Cl.
*B29C 33/62* (2006.01)
*B29C 41/08* (2006.01)
*B29C 41/42* (2006.01)
*B29K 7/00* (2006.01)

(52) U.S. Cl.
CPC .............. *B29C 33/62* (2013.01); *B29C 41/08* (2013.01); *B29C 41/42* (2013.01); *B29K 2007/00* (2013.01)

(58) Field of Classification Search
CPC ......... B29C 41/08; B29C 41/42; B29C 41/10; B29K 2007/00
See application file for complete search history.

(56) References Cited

U.S. PATENT DOCUMENTS

| | | | | |
|---|---|---|---|---|
| 2,207,815 A | * | 7/1940 | Ogilby | .................... B29C 41/08 264/297.4 |
| 2007/0199811 A1 | * | 8/2007 | Hotta | ..................... H01H 35/02 200/310 |
| 2012/0114954 A1 | * | 5/2012 | Drieghe | .................. B29C 41/22 428/423.3 |
| 2018/0119242 A1 | * | 5/2018 | Kobayashi | ................ C25F 3/14 |
| 2020/0223108 A1 | * | 7/2020 | Machlev | ................. B29C 41/14 |

* cited by examiner

*Primary Examiner* — Alison L Hindenlang
*Assistant Examiner* — Debjani Roy
(74) *Attorney, Agent, or Firm* — Flener IP & Business Law; Zareefa B. Flener

(57) ABSTRACT

The present invention relates to the technical field of flexible drag reduction coatings, and in particular to a method for preparing a flexible and elastic drag reduction film. The flexible and elastic drag reduction film prepared by the present invention has excellent flexibility and elasticity. The film has a groove structure on a surface, and is suitable for curved surfaces and pipe surfaces of different diameters. The film is directly used without the need for an adhesive. It is sheathed on curved structures or devices of different diameters and curvatures by virtue of its own flexibility and elasticity, reducing an error due to the film adhesion.

7 Claims, 2 Drawing Sheets

PREPARATION METHOD AND USE OF FLEXIBLE AND ELASTIC DRAG REDUCTION FILM

TECHNICAL FIELD

The present invention relates to the technical field of flexible drag reduction coatings, and in particular to a preparation method and use of a flexible and elastic drag reduction film.

BACKGROUND

At present, the flexible surface coating technology is relatively mature, and there are mainly two methods for preparing flexible coatings. One method is to adhere the prepared flexible film to the surface of the object through an adhesive, but this method inevitably has physical stitching. The uneven application of the adhesive causes unevenness on the surface, making it difficult to stick the film on a curved surface with a relatively large curvature. The other method is to spray the prepared solution directly on the surface of the test object to form the desired flexible coating. Although this method forms a smooth and elastic coating on the surface of the sprayed test object, it cannot form a drag reduction microstructure on the surface of the coating.

SUMMARY

An objective of the present invention is to provide a method for preparing a flexible and elastic drag reduction film for a curved surface.

To achieve the above purpose, the present invention provides the following technical solutions.

A method for preparing a flexible and elastic drag reduction film includes the following steps:

forming a groove structure on a surface of a steel plate;

spraying a rubber matte oil solution or a self-drying rubber paint onto a surface of the groove structure, and then sequentially performing first curing and first unmolding to obtain a rubber matte oil film or a self-drying rubber oil film, where one side of the rubber matte oil film or the self-drying rubber oil film has a groove structure, and the other side is a flat surface; and spraying a natural latex on the groove side of the rubber matte oil film or the self-drying rubber oil film, and then sequentially performing second curing and second unmolding to obtain a flexible and elastic drag reduction film.

Preferably, the groove structure is a straight groove structure, V-shaped, U-shaped or L-shaped.

Preferably, the groove structure has a width of 180-320 μm, a depth of 125-180 μm and a depth/width ratio of 0.56-0.69.

Preferably, the rubber matte oil solution includes a rubber matte oil, a curing agent and a diluent;

the mass ratio of the rubber matte oil, the curing agent and the diluent is 10:1:(0-20).

Preferably, the first curing is performed at 20-30° C. for 4-6 h.

Preferably, the second curing is performed at 20-30° C. for 1-3 h.

Preferably, a first-cured product or a second-cured product is soaked independently for 1-4 h before the first unmolding or the second unmolding.

Preferably, the natural latex is sprayed onto the groove side of the rubber matte oil film or the self-drying rubber oil film at the speed of 130-240 mL/min and the distance of 150-200 mm.

The present invention further provides use of a flexible and elastic drag reduction film prepared by the above preparation method on a surface of a curved structure or device.

The present invention provides a method for preparing a flexible and elastic drag reduction film, including the following steps: forming a groove structure on a surface of a steel plate; spraying a rubber matte oil solution or a self-drying rubber paint onto a surface of the groove structure, and then sequentially performing first curing and first unmolding to obtain a rubber matte oil film or a self-drying rubber oil film, where one side of the rubber matte oil film or the self-drying rubber oil film has a groove structure, and the other side is a flat surface; and spraying a natural latex on the groove side of the rubber matte oil film or the self-drying rubber oil film, and then sequentially performing second curing and second unmolding to obtain a flexible and elastic drag reduction film. The flexible and elastic drag reduction film prepared by the present invention has excellent flexibility and elasticity. The film has a groove structure on the surface, and is suitable for curved surfaces and pipes of different diameters. The film is directly used without the need for an adhesive. It is sheathed on curved structures or devices of different diameters by virtue of its own flexibility and elasticity. The film is fixed by a friction force with the curved structures or devices after it is stretched, which reduces an error due to the film adhesion. The flexible film is a monolithic film, which is like a "clothing" with an elastic and micron-scale structure on the surface of a model. Compared with the use of an adhesive to stick the film to the surface, this method avoids physical stitching, so the entire surface transitions smoothly. The method also avoids a shape resistance caused by the unevenness of the surface due to the uneven adhesive application. As the flexible and elastic film fits the curved surface well by relying on its own elastic pulling force, its effect is better than one stuck directly to the surface.

DETAILED DESCRIPTION

Figure 1:
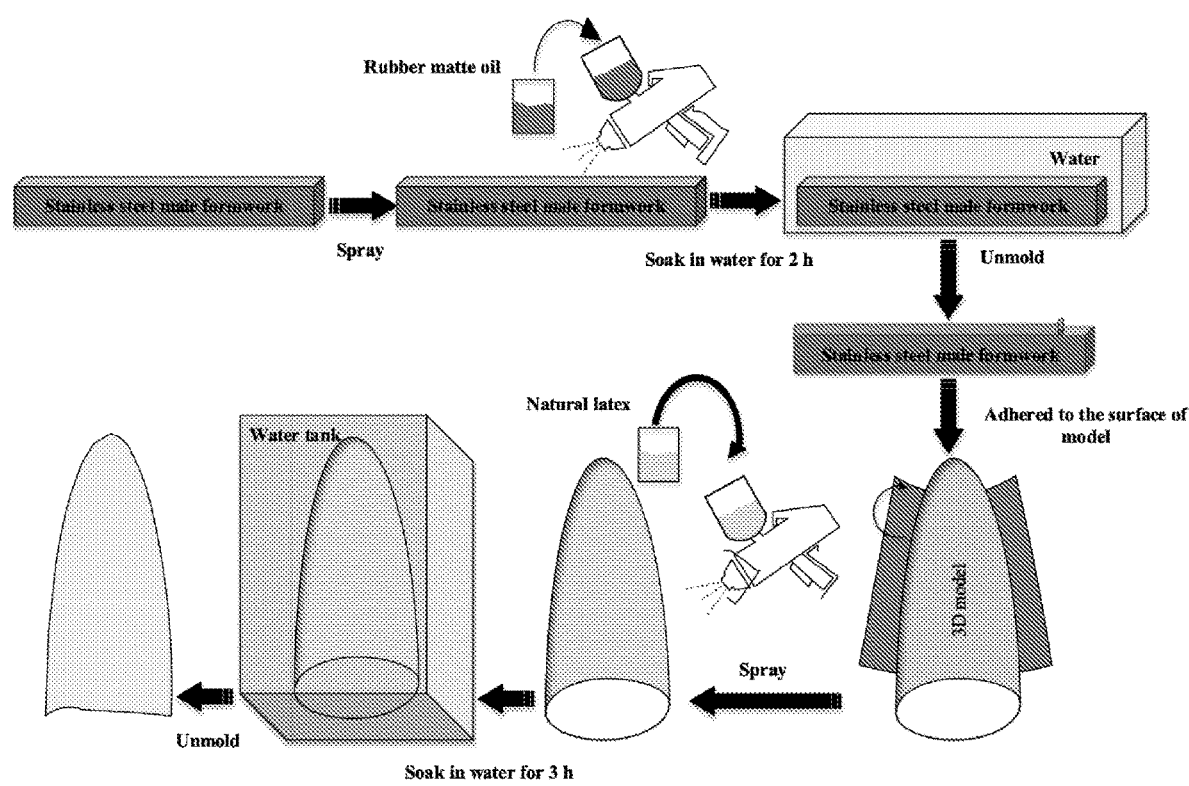
FIG. 1 is a flowchart of preparing a flexible and elastic drag reduction film according to the present invention.

The present invention provides a method for preparing a flexible and elastic drag reduction film, including the following steps:

form a groove structure on a surface of a steel plate;

spray a rubber matte oil solution or a self-drying rubber paint onto a surface of the groove structure, and then sequentially perform first curing and first unmolding to obtain a rubber matte oil film or a self-drying rubber oil film, where one side of the rubber matte oil film or the self-drying rubber oil film has a groove structure, and the other side is a flat surface; and spray a natural latex on the groove side of the rubber matte oil film or the self-drying rubber oil film, and then sequentially perform second curing and second unmolding to obtain a flexible and elastic drag reduction film.

In the present invention, unless otherwise specified, all raw material components are commercially available products well known to those skilled in the art.

The present invention forms a groove structure on a surface of a steel plate. In the present invention, the groove structure is preferably a straight groove structure, V-shaped, U-shaped or L-shaped, and more preferably a straight groove structure. The width of the groove structure is preferably 200-300 μm, more preferably 220-280 μm, and most preferably 240-260 μm. The depth of the groove structure is preferably 125-180 μm, more preferably 130-170 μm, and most preferably 140-160 μm. The depth/width ratio of the groove structure is preferably 0.6-0.625.

In the present invention, the steel plate is preferably a stainless steel plate. The process of forming the groove structure on the surface of the steel plate is performed preferably by a machining milling machine. The diameter of milling cutters of the machining milling machine is preferably 0.2 mm and 0.3 mm. The 0.2 mm and 0.3 mm milling cutters preferably work separately.

The present invention has no special limit on the specific process of machining the surface of the steel plate by the machining milling machine, and a process well known to those skilled in the art can be used to obtain the groove structure with the above specific shapes and dimensions.

After the groove structure is formed on the surface of the steel plate, the present invention sprays a rubber matte oil solution or a self-drying rubber paint onto a surface of the groove structure, and then sequentially performs first curing and first unmolding to obtain a rubber matte oil film or a self-drying rubber oil film. One side of the rubber matte oil film or the self-drying rubber oil film has a groove structure, and the other side is a flat surface.

In the present invention, the rubber matte oil solution preferably includes a rubber matte oil, a curing agent and a diluent. The rubber matte oil is preferably a commercially available product. The present invention has no special limit on the curing agent and the diluent, and a commercially available product well known to those skilled in the art can be used.

In the present invention, the mass ratio of the rubber matte oil, the curing agent and the diluent is preferably 10:1:(0-20), more preferably 10:1:(5-15), and most preferably 10:1:10.

The present invention has no special limit on the self-drying rubber paint, and a commercially available product well known to those skilled in the art can be used.

In the present invention, the speed of the spraying is preferably 140-160 mL/min, and more preferably 145-155 mL/min. The distance of the spraying is preferably 160-200 mm, and more preferably 180 mm.

In the present invention, the spraying is preferably performed by a W-101 gravity pneumatic car paint spray gun.

In the present invention, the drying temperature is preferably 20-30° C., more preferably 24-26° C. and most preferably 25° C.; and the drying time is preferably 4-6 h, and more preferably 5 h.

The present invention has no special limit on the first unmolding, and an unmolding process well known to those skilled in the art can be used.

In the present invention, a first-cured product is preferably soaked with a soaking medium that is preferably water before the first unmolding. The soaking is performed preferably at room temperature for preferably 1-4 h, and more preferably 2-3 h.

In the present invention, the purpose of the soaking is to make the cured rubber matte oil film easily detach from the surface of the steel plate base.

In the present invention, the thickness of the rubber matte oil film is preferably 300-440 μm, and more preferably 350-400 μm. The thickness ensures that one side of the obtained rubber matte oil film has a groove structure and the other side has a flat structure.

After the rubber matte oil film is obtained, the present invention sprays a natural latex on the groove side of the rubber matte oil film or the self-drying rubber oil film, and then sequentially performs second curing and second unmolding to obtain a flexible and elastic drag reduction film.

In the present invention, the natural latex is preferably a commercially available product well known to those skilled in the art, and can specifically be 3 trees natural latex.

Before spraying, the present invention preferably uses an adhesive tape to fix the side of the rubber matte oil film without the groove structure to a curved surface model of a fish-like head to ensure the smooth progress of the subsequent spraying.

In the present invention, the speed of the spraying is preferably 130-240 mL/min, and more preferably 160-200 mL/min. The distance of the spraying is preferably 150-200 mm, and more preferably 160-180 mm.

In the present invention, the spraying is preferably performed by a W-101 gravity pneumatic car paint spray gun.

In the present invention, the temperature of the second curing is preferably 20-30° C., more preferably 24-26° C. and most preferably 25° C. The time of the second curing is preferably 4-6 h, and more preferably 5 h.

The present invention has no special limit on the second unmolding, and an unmolding process well known to those skilled in the art can be used.

In the present invention, a second-cured product is preferably soaked with a soaking medium that is preferably water before the second unmolding. The soaking is performed preferably at room temperature for preferably 1-4 h, and more preferably 2-3 h.

In the present invention, the purpose of the soaking is to make the cured rubber matte oil film easily detach from the surface of the steel plate base.

In the present invention, the flexible and elastic drag reduction film has a thickness of preferably 300-440 μm, and more preferably 350-400 μm.

The thickness maintains the flexibility of the film, making it easy to adhere to the curved surface.

The present invention also provides use of a flexible and elastic drag reduction film prepared by the preparation method described in the above technical solution on a surface of a curved structure or device.

The method for preparing a flexible and elastic drag reduction film provided by the present invention is described in detail below with reference to the examples, but the examples may not be understood as limiting the protection scope of the present invention.

Example 1

A U-shaped straight groove structure (groove width 0.2 mm and depth 125 μm) was machined on a surface of a stainless steel plate by using a machining milling machine (milling cutter diameter 0.2 mm).

A W-101 gravity pneumatic car paint spray gun was used to spray a rubber matte oil solution composed of a rubber matte oil, a curing agent and a thinner with a ratio of 10:1:20 to a surface of the groove structure at the speed of 150 mL/min and the distance of 180 mm. After curing at 25° C. for 5 h, the steel plate was soaked in water for 2 h, and then unmolding was carried out at room temperature to obtain a rubber matte oil film with a thickness of 340 μm.

One side of the rubber matte oil film without the groove structure was fixed on a flat or curved surface base. A W-101 gravity pneumatic car paint spray gun was used to spray a natural latex with a mass concentration of 150 g onto the rubber matte oil film at the speed of 100 mL/min and the distance of 180 mm. After curing at 25° C. for 2 h, the steel plate was soaked in water for 3 h, and then unmolding was carried out at room temperature to obtain a flexible and elastic drag reduction film with a thickness of 340 μm.

The flexible and elastic drag reduction film was integrally sheathed on a curved surface model of a fish-like head. The flexible and elastic drag reduction film perfectly fit the surface of the curved surface model, mainly because the stretch rate of the flexible and elastic drag reduction film reached 62.52%.

After the flexible and elastic drag reduction film was placed on the curved surface model, an end was fixed with a waterproof tape to prevent water ingress during the test. The experiment was conducted in a towed pool with a water velocity ranging from 0 to 0.24 m/s. A force balance was used to measure the resistance. The test results are shown in Table 1.

TABLE 1

Friction force of the smooth surface and the flexible and elastic drag reduction film at different water velocities

| Water velocity | 0.03 m/s | 0.06 m/s | 0.09 m/s | 0.12 m/s | 0.15 m/s | 0.18 m/s | 0.21 m/s | 0.24 m/s |
|---|---|---|---|---|---|---|---|---|
| Smooth surface (friction force mN) | 7.53 | 19.33 | 31.33 | 43.33 | 66 | 92.67 | 110.67 | 151.33 |
| Flexible and elastic drag reduction film (friction force mN) | 6.67 | 17.67 | 28.33 | 43.17 | 63.67 | 91.33 | 105.66 | 154.67 |

Figure 2:
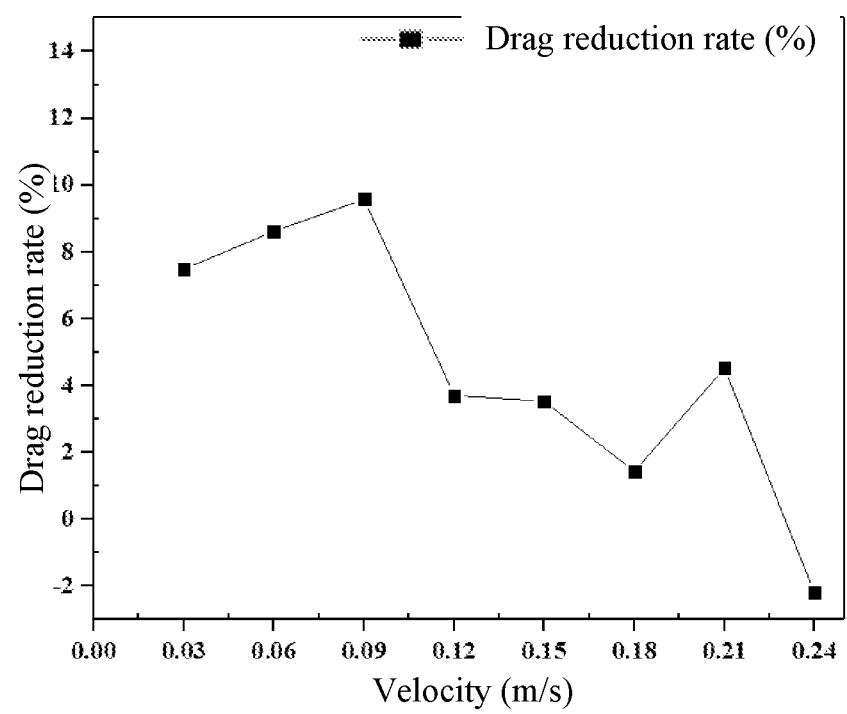
FIG. 2 is a graph of a drag reduction rate of a flexible and elastic drag reduction film prepared by Example 1 of the present invention at different water velocities compared to a smooth surface.

FIG. 2 is a graph of a drag reduction rate of the flexible and elastic drag reduction film prepared by Example 1 of the present invention at different water velocities compared to the smooth surface. This graph is a summary of Table 1. It shows that compared with the smooth surface, the drag reduction rate of the drag reduction film is the highest at the tow speed of 0.09 m/s, which reaches 9%.

Example 2

A U-shaped straight groove structure (groove width 0.3 mm and depth 180 μm) was machined on a surface of a stainless steel plate by using a machining milling machine (milling cutter diameter 0.3 mm).

A W-101 gravity pneumatic car paint spray gun was used to spray a rubber matte oil solution composed of a rubber matte oil, a curing agent and a thinner with a ratio of 10:1:10 to a surface of the groove structure at the speed of 150 mL/min and the distance of 180 mm. After curing at 25° C. for 5 h, the steel plate was soaked in water for 2 h, and then unmolding was carried out at room temperature to obtain a rubber matte oil film with a thickness of 340 μm.

One side of the rubber matte oil film without the groove structure was fixed on a flat or curved surface base. A W-101 gravity pneumatic car paint spray gun was used to spray a natural latex with a mass concentration of 200 g onto the rubber matte oil film at the speed of 100 mL/min and the distance of 180 mm. After curing at 25° C. for 2 h, the steel plate was soaked in water for 3 h, and then unmolding was carried out at room temperature to obtain a flexible and elastic drag reduction film with a thickness of 400 μm.

The test results are similar to those of Example 1.

Example 3

A U-shaped straight groove structure (groove width 0.5 mm and depth 200 μm) was machined on a surface of a stainless steel plate by using a machining milling machine (milling cutter diameter 0.5 mm).

A W-101 gravity pneumatic car paint spray gun was used to spray a rubber matte oil solution composed of a rubber matte oil, a curing agent and a thinner with a ratio of 10:1:10 to a surface of the groove structure at the speed of 150 mL/min and the distance of 180 mm. After curing at 25° C. for 5 h, the steel plate was soaked in water for 2 h, and then unmolding was carried out at room temperature to obtain a rubber matte oil film with a thickness of 400 μm.

One side of the rubber matte oil film without the groove structure was fixed on a flat or curved surface base. A W-101 gravity pneumatic car paint spray gun was used to spray a natural latex with a mass concentration of 150 g onto the rubber matte oil film at the speed of 100 mL/min and the distance of 180 mm. After curing at 25° C. for 2 h, the steel plate was soaked in water for 3 h, and then unmolding was carried out at room temperature to obtain a flexible and elastic drag reduction film with a thickness of 340 μm.

The test results are similar to those of Example 1.

The above examples show that the flexible and elastic drag reduction film prepared by the preparation method of the present invention has excellent flexibility and elasticity. The film has a groove structure on the surface, and is suitable for curved surfaces and pipes of different diameters. The film is directly used without the need for an adhesive. It is sheathed on curved structures or devices of different diameters by virtue of its own flexibility and elasticity. The film is fixed by a friction force with the curved structures or devices after it is stretched, which reduces an error due to the film adhesion.

The above described are merely preferred implementations of the present invention. It should be noted that a person of ordinary skill in the art may further make several improvements and modifications without departing from the principle of the present invention, but such improvements and modifications shall also be deemed as falling within the protection scope of the present invention.

What is claimed is:

1. A method for preparing a flexible and elastic drag reduction film, comprising the following steps:
   forming a groove structure on a surface of a steel plate;
   spraying a rubber matte oil solution or a self-drying rubber paint onto a surface of the groove structure, performing a first curing to form a first film, and performing a first unmolding to obtain a rubber matte oil film or a self-drying rubber oil film, wherein one side of the rubber matte oil film or the self-drying rubber oil film has a groove structure, and the other side is a flat surface; and spraying a natural latex on the groove side of the rubber matte oil film or the self-drying rubber oil film, performing a second curing to form a second film, and performing a second unmolding to obtain a flexible and elastic drag reduction film;

wherein the rubber matte oil solution comprises a rubber matte oil, a curing agent and a diluent;

the mass ratio of the rubber matte oil, the curing agent and the diluent is 10:1:(0-20).

2. The preparation method according to claim 1, wherein the groove structure is a straight groove structure, V-shaped, U-shaped or L-shaped.

3. The preparation method according to claim 2, wherein the groove structure has a width of 180-320 μm, a depth of 125-180 μm and a depth/width ratio of 0.56-0.69.

4. The preparation method according to claim 1, wherein the first curing is performed at 20-30° C. for 4-6 h.

5. The preparation method according to claim 1, wherein the second curing is performed at 20-30° C. for 1-3 h.

6. The preparation method according to claim 1, wherein a first-cured product or a second-cured product is soaked independently for 1-4 h before the first unmolding or the second unmolding.

7. The preparation method according to claim 1, wherein the natural latex is sprayed onto the groove side of the rubber matte oil film or the self-drying rubber oil film at the speed of 130-240 mL/min and the distance of 150-200 mm.

* * * * *